(12) United States Patent
Tapper

(10) Patent No.: US 8,627,342 B2
(45) Date of Patent: Jan. 7, 2014

(54) MULTI-MACHINE SHELL

(76) Inventor: Paul Michael Tapper, Guildford (GB)

( * ) Notice: Subject to any disclaimer, the term of this patent is extended or adjusted under 35 U.S.C. 154(b) by 1307 days.

(21) Appl. No.: 12/228,077

(22) Filed: Jan. 31, 2008

(65) Prior Publication Data

US 2009/0228821 A1    Sep. 10, 2009

(51) Int. Cl.
*G06F 13/00* (2006.01)
(52) U.S. Cl.
USPC .......................................... 719/320; 719/328
(58) Field of Classification Search
USPC .................................................. 719/320, 328
See application file for complete search history.

(56) References Cited

U.S. PATENT DOCUMENTS

| | | | |
|---|---|---|---|
| 6,721,808 B1 | 4/2004 | Singh | |
| 6,886,024 B1 | 4/2005 | Fujita | |
| 2006/0026601 A1 | 2/2006 | Solt | |
| 2006/0168158 A1* | 7/2006 | Das | 709/220 |
| 2007/0226773 A1* | 9/2007 | Pouliot | 726/1 |
| 2007/0282964 A1* | 12/2007 | Behrend et al. | 709/208 |
| 2009/0216869 A1* | 8/2009 | Kennedy | 709/223 |

FOREIGN PATENT DOCUMENTS

| | | |
|---|---|---|
| GB | 2394575 | 4/2004 |
| WO | WO 2005/074408 | 8/2005 |

OTHER PUBLICATIONS

Kaneda, Taura, Yonezawa, "Virtual Private Grid: A Command Shell for Utilizing Hundreds of Machines Efficiently".
Truong, Harwood, "Distributed Shell over Peer to Peer Network".

* cited by examiner

*Primary Examiner* — Andy Ho

(57) ABSTRACT

A shell capable of operating a plurality of computer systems and possibly using a plurality of user credentials. An embodiment is described whereby a single command can involve a plurality of different processes operating on a plurality of machines under a plurality of user credentials.

12 Claims, 7 Drawing Sheets

```
(A) command          := context_command | list_command ;

(B) context_command  := [ WORD ] PERCENT resource ;

(C) list_command     := [ LIST_OPERATOR ] pipe_command
                        { LIST_OPERATOR pipe_command } ;

(D) pipe_command     := resource { attachment }
                        { PIPE_OPERATOR resource { attachment } } ;

(E) attachment       := [ redirect | argument ] ;

(F) redirect         := REDIRECT_OPERATOR resource ;

(G) resource         := [ context ] [ relative_path | uri ] ;

(H) context          := [ WORD ] HASH ;

(I) scheme           := WORD COLON ;

(J) authority        := ( WORD [ COLON [ WORD ] ] ) | ( COLON WORD ) ;

(K) address          := ( WORD [ COLON [ WORD ] ] ) | ( COLON WORD ) ;

(L) relative_path    := WORD [ path_continuation ] ;

(M) absolute_path    := SLASH [ WORD | ( WORD path_continuation ) ] ;

(N) path_continuation := { SLASH [ WORD ] } ;

(O) argument         := resource | WORD ;

(P) uri              := [ scheme ] [ SLASH SLASH ]
                        [ ( authority AT ) | AT ]
                        [ address ]
                        [ absolute_path ] ;

(Q) LIST_OPERATOR    := '&&' | '||' | ';;' ;

(R) PERCENT          := '%' ;

(S) HASH             := '#' ;

(T) REDIRECT_OPERATOR := '>' | '->' | '+>' | '>>' | '->>' | '+>>' | '<' ;

(U) PIPE_OPERATOR    := '|' | '-|' | '+|' ;

(V) SLASH            := '/' ;

(W) WORD             := input containing text, symbols and a suitable
                        quoting mechanism ;

(X) COLON            := ':' ;
```

Figure 6

MULTI-MACHINE SHELL

BACKGROUND OF THE INVENTION

1. Field of Invention

The present invention relates to methods for operating a plurality of computers in a similar manner to the way in which a shell or command interpreter operates a single machine.

2. Prior Art

Hereinafter the term shell will be used to refer to a shell or command interpreter. Examples of shells in the prior art include command.com supplied with Microsoft DOS, bash used on Unix and Linux systems and explorer.exe, the graphical user interface supplied with Microsoft Windows XP.

Shells and Other Software

A general purpose computer system runs several pieces of software which can be viewed as providing different levels of functionality. This is illustrated in FIG. 1. Here the level of functionality is determined by how abstract a task is compared to the actual functions of the computer hardware. It does not necessarily relate to the complexity of the software.

The operating system, including device drivers (101), is the lowest level software component. The operating system is concerned with for example opening and closing files, launching and managing applications and interfacing with the hardware (102). The operating system provides an application programming interface for higher level software components (103). The functions in this interface are known as system calls. FIG. 1 shows how higher level software builds (104) on lower level software to perform functions which are both more abstract and more directly useful to the user.

Because the operating system is accessed with system calls it cannot be used directly by a user. A shell (105) is an application which provides a user interface to the basic functionality supported by the operating system. As its functions are fairly close to those provided by the operating system it is considered to be a low level application.

A shell can be text based, like for example "bash" or "csh", or provide a graphical user interface like explorer.exe which displays files and folders under Windows XP. Shells may be closely associated with particular operating systems but they are application programs.

Shells are usually designed to work on a particular operating system but in some cases they can be adapted to work on a variety of operating systems. For example, the bash shell, originally designed to work on unix-like operating systems can be used under Microsoft Windows XP.

Some shells provide additional functionality not directly supported by the underlying operating system. For example bash provides commands for storing and retrieving variables, commands for conditionally executing other commands and commands for executing commands several times.

Some shells can accept a sequence of commands from a file. This capability, together with the additional commands mentioned above mean the shell can also act as an interpreter for a simple programming language. A program written for a shell is known as a shell script or batch file (106).

Terminals and Terminal Emulators

Historically interaction with a central computer was done via a terminal. This is illustrated in FIG. 2. This diagram illustrates a physical terminal (201), for example a VT320 made by Digital, being used with a unix-like operating system. The terminal is connected to a port on the computer (202) and this port is managed by part of the operating system called the terminal driver (203). This terminal driver provides a standardised interface to the physical terminal (204) which an application program (205) can interact with. One such application program would be a shell.

FIG. 3 illustrates a modern computing environment where physical terminals are usually replaced with terminal emulation programs (301, 302) running on desktop computers (303) or on the central computer itself (304). The terminal emulation software sends and receives characters and displays characters to the user in the same way a physical terminal would do. In order to allow application programs to use this emulated terminal in the same way as they would use a real terminal an operating system component known as a pseudo terminal (305) is used. The pseudo terminal provides a terminal interface to the application program (306) in the same way the terminal driver would do if a physical terminal were used. The pseudo terminal then presents a second interface to the terminal emulation program to allow it to send characters to and receive characters from the operating system in the same way a physical terminal would send characters to and receive characters from the computer hardware and terminal driver.

Running Process on Remote Systems

Several technologies are available for running a program on a remote computer from a local computer. One example under Unix and unix-like operating systems is "rsh". This allows users to either start an interactive shell on a remote machine or to launch a process on a remote machine making the results available on the first machine. The use of rsh can be seen in FIG. 3. The system consists of a daemon process (307) and a client component (308).

Other techniques used at a programming level to access remote systems include Remote Procedure Calls (RPC), Remote Method Invocation (RMI), etc.

Shared File Systems

Several technologies are available to make files from one computer available to other computers on a network. One such example is Network File System (NFS) originally developed by Sun Microsystems, widely used on Unix and unix-like operating systems. Another example is the Common Internet File System (CIFS), widely used by Microsoft.

User Accounts

Modern operating systems maintain separate accounts for different users. Accounts are also used for different functions, for example a system account may be used for running processes related to the operating system. Different accounts may have different access privileges. Users may sometimes need to access multiple accounts on the same system or need to use different account credentials on different systems for a variety of reasons.

Limitations of Current Shells

Current shell software is designed to perform operations on the machine on which it is running. Commands which deal with multiple machines are not supported directly by current shells. There are two main aspects to accessing remote machines: access to files and the ability to run processes.

Files on remote machines can be accessed using shared file systems as described above. However, files on a remote machine are not typically available in the same way on a remote machine as they are on a local machine. When accessing files remotely it may be that only a subset of the files are available and access rights may be different to those obtained when working on the machine directly. Furthermore, the paths used for a particular file may be different from machine to machine. Also note that such remote file access is a function of the underlying operating system and not a function of the shell itself.

Current shells do not directly launch processes on remote machines. Instead remote processes are typically started by a separate program designed for this purpose which is, as far as the shell is concerned, just another local command. For example, when using the bash shell on a Unix system a user may use the rsh command to start a process on another machine. The rsh command is not part of the bash shell and running a remote command like this is not as easy as running a command locally. When entering the name or arguments of the command to run on the remote machine for example, command line completion is not available as it would be for a local command. The shell cannot provide facilities like command line completion because it is not directly operating on the remote machine.

The problems of remote file access and remote process execution compound one another because any view of the remote file system available to the user is likely to be different from the file system view which will be available to the remote process. Users must understand and remember the relationship between the two sets of file systems when entering commands which involve a remote machine and files which can be seen from both machines.

Shells are also limited in the way they can handle multiple user accounts. Although the operating system may allow some flexibility in mapping account names on remote file systems, shells themselves are currently designed to work directly with only one set of user credentials. As with remote process execution, separate programs can be used to launch processes with different account credentials but this method is difficult to use. Under Unix for example the "su" command can be used to launch a program using a different user account. Again the shell will not be fully aware of the environment under which the new command will be launched and may not be able to provide correct completions for the command and arguments etc.

Another problem with both running processes on remote machines and running processes under different accounts on the same machine is that launching processes this way may require passwords. These passwords may be required each time the command is executed and the password prompting process may interfere with the intended operation of the overall command.

Yet another problem with current shells which use a text based user interface is that they do not cope well with running multiple commands simultaneously. For example, using the bash shell, commands can be put into the background allowing other commands to be launched.

This has several problems:
(1) The output from multiple background processes is mixed on the screen.
(2) Output from background tasks gets mixed with the user input required to launch further tasks making commands being entered unreadable.
(3) Background tasks are stopped when they attempt to obtain input from the user. Users must enter further commands to switch between processes. Also a process designed to perform processing whilst simultaneously being responsive to user input may not perform correctly as all processing is likely to be stopped once user input is requested.
(4) Commands which have been launched with different user credentials (using an auxiliary command to alter these as described above) may not be able to interact correctly with the terminal because of the ownership and access permissions associated with the terminal, pseudo terminal or equivalent.

SUMMARY OF THE INVENTION

The current invention consists of methods to be used in a shell for operating a plurality of machines rather than operating primarily one machine. Some of these methods may also be applicable in the wider context of computer software rather than just computer shells. Unlike methods used in previous shell environments, with the current invention, all accessible machines are treated equally and can play a part in any command regardless of their operating system or access method. Multiple sets of user credentials are also supported. Using the current invention a single command can involve a plurality of different processes operating on specific machines under specific user credentials all working together. The invention addresses all of the limitations of current shells discussed above using a combination of novel techniques which will be described below.

These first three figures represent the prior art and are discussed above.

Figure 1:
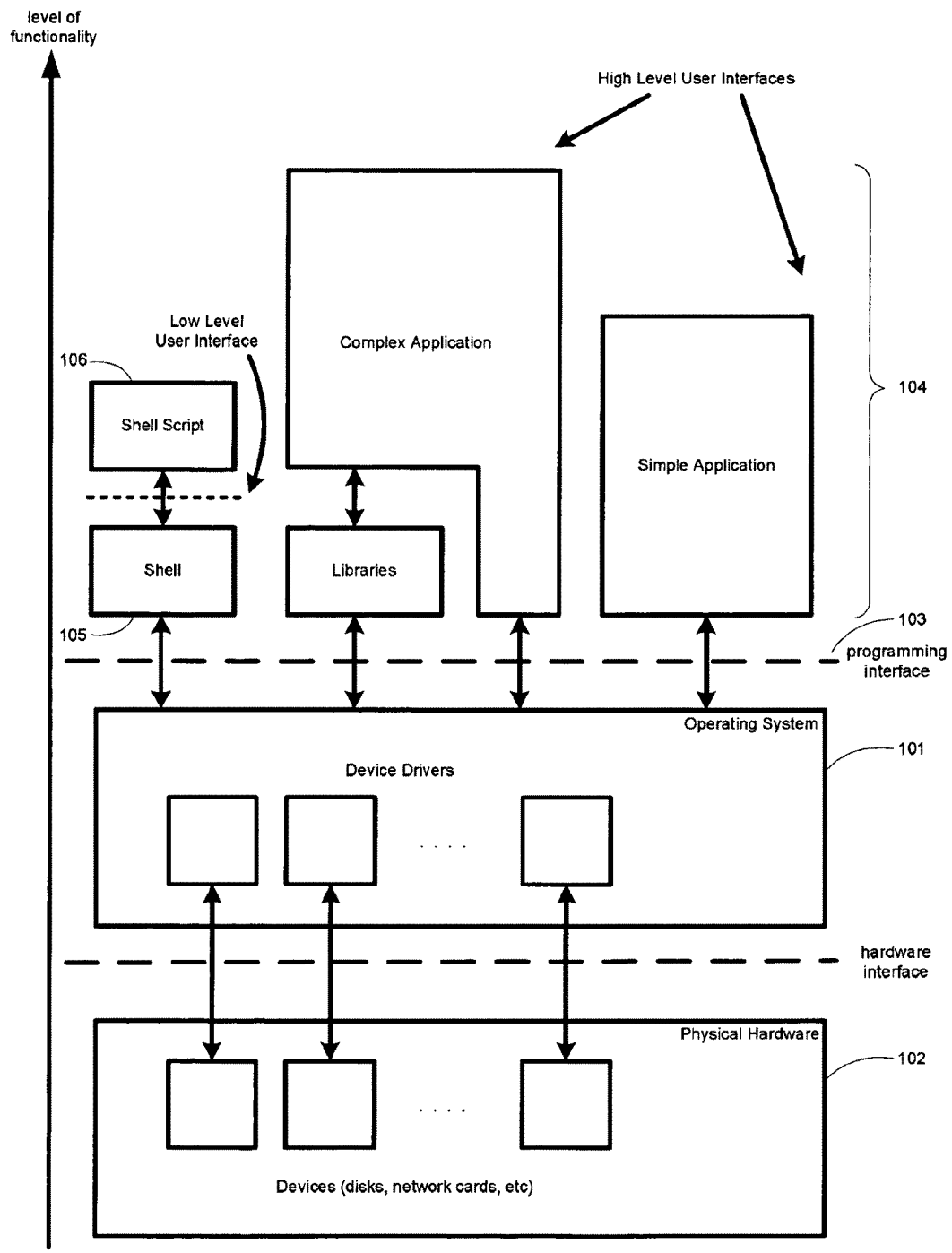
FIG. 1 illustrates the role of a shell in the prior art and shows how it relates to other software.
Figure 2:
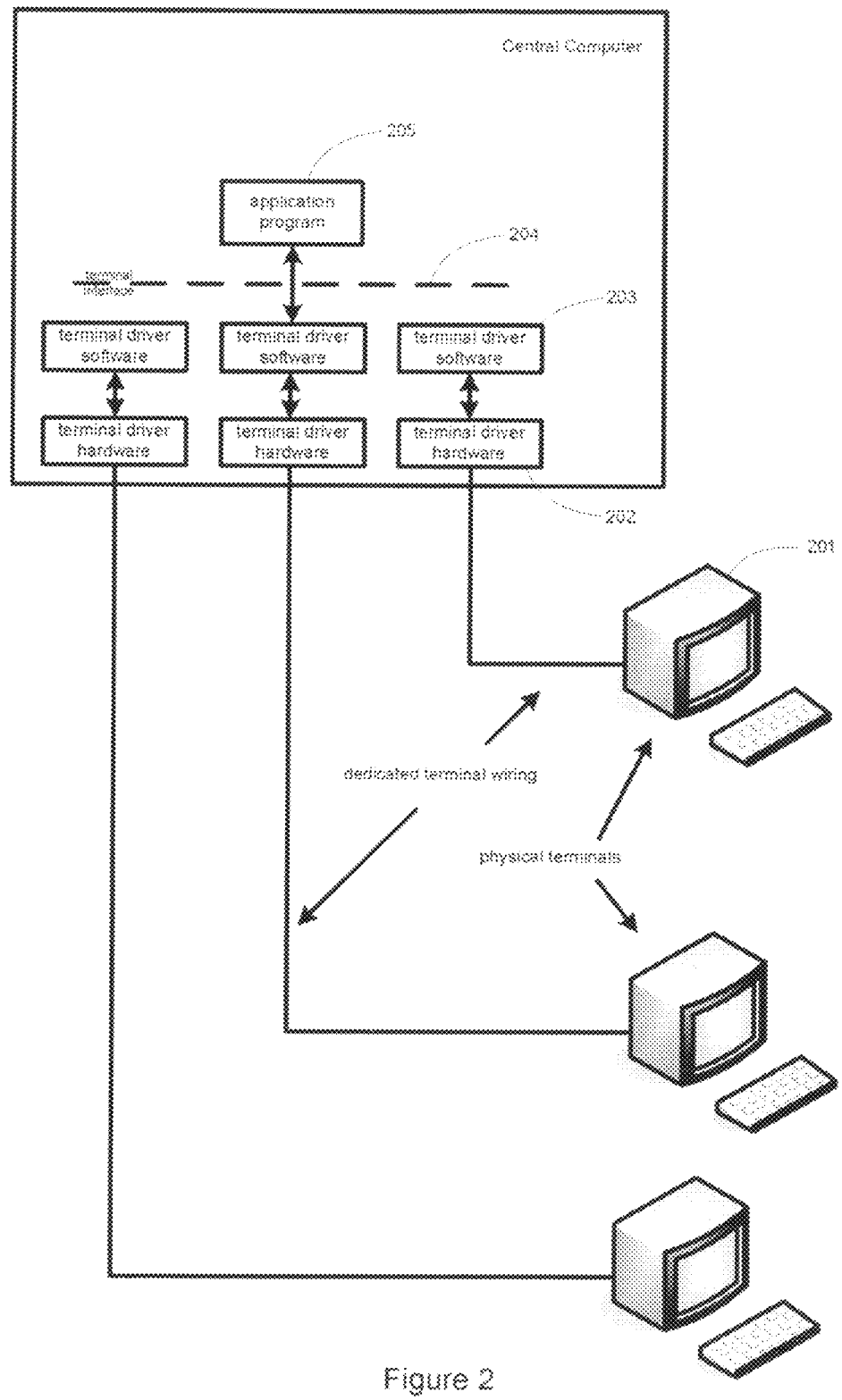
FIG. 2 illustrates the connection of physical terminals to a central computer, showing the hardware and software components involved.
Figure 3:
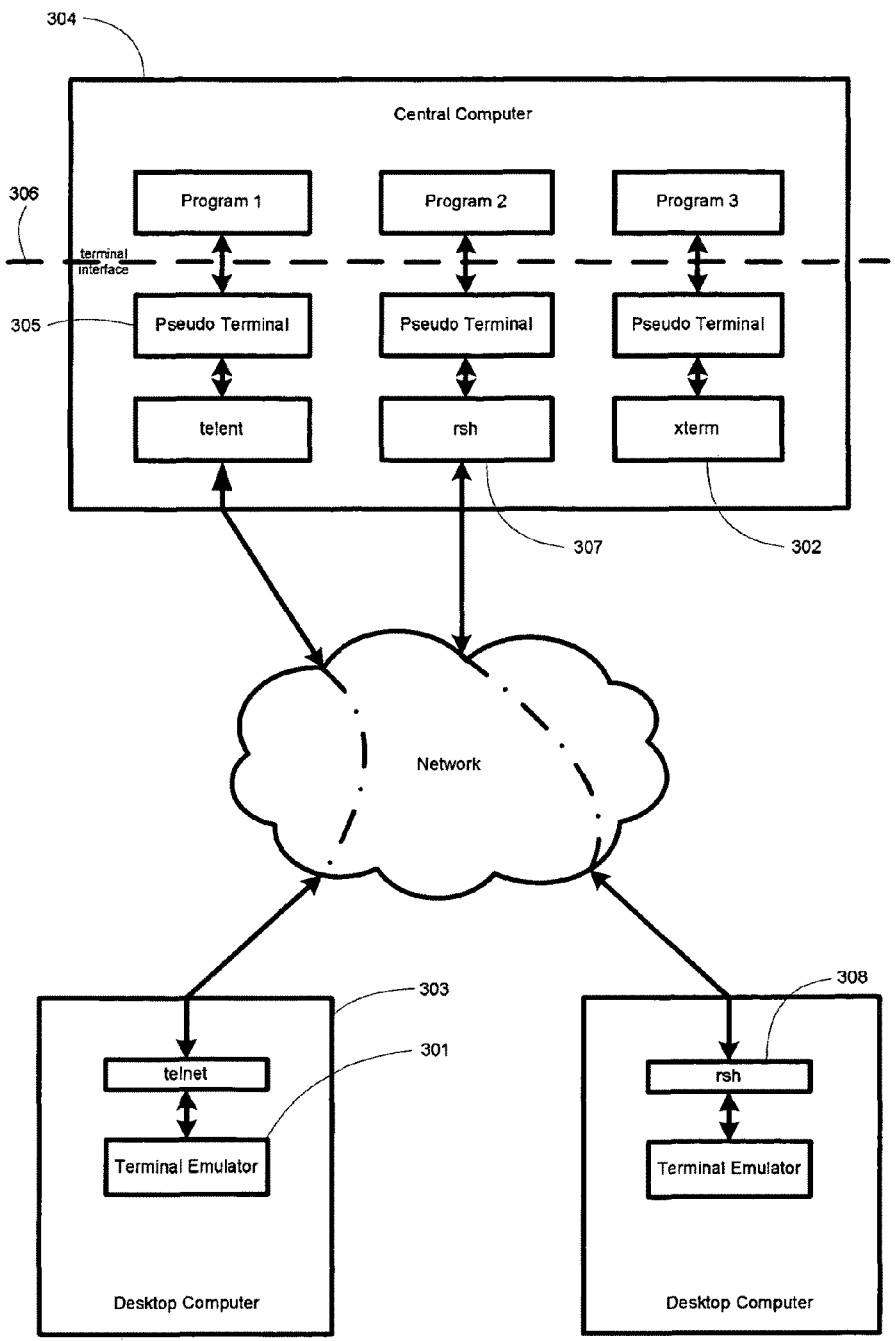
FIG. 3 illustrates the components involved in emulating physical terminals in a more modern computing environment.
Figure 4:
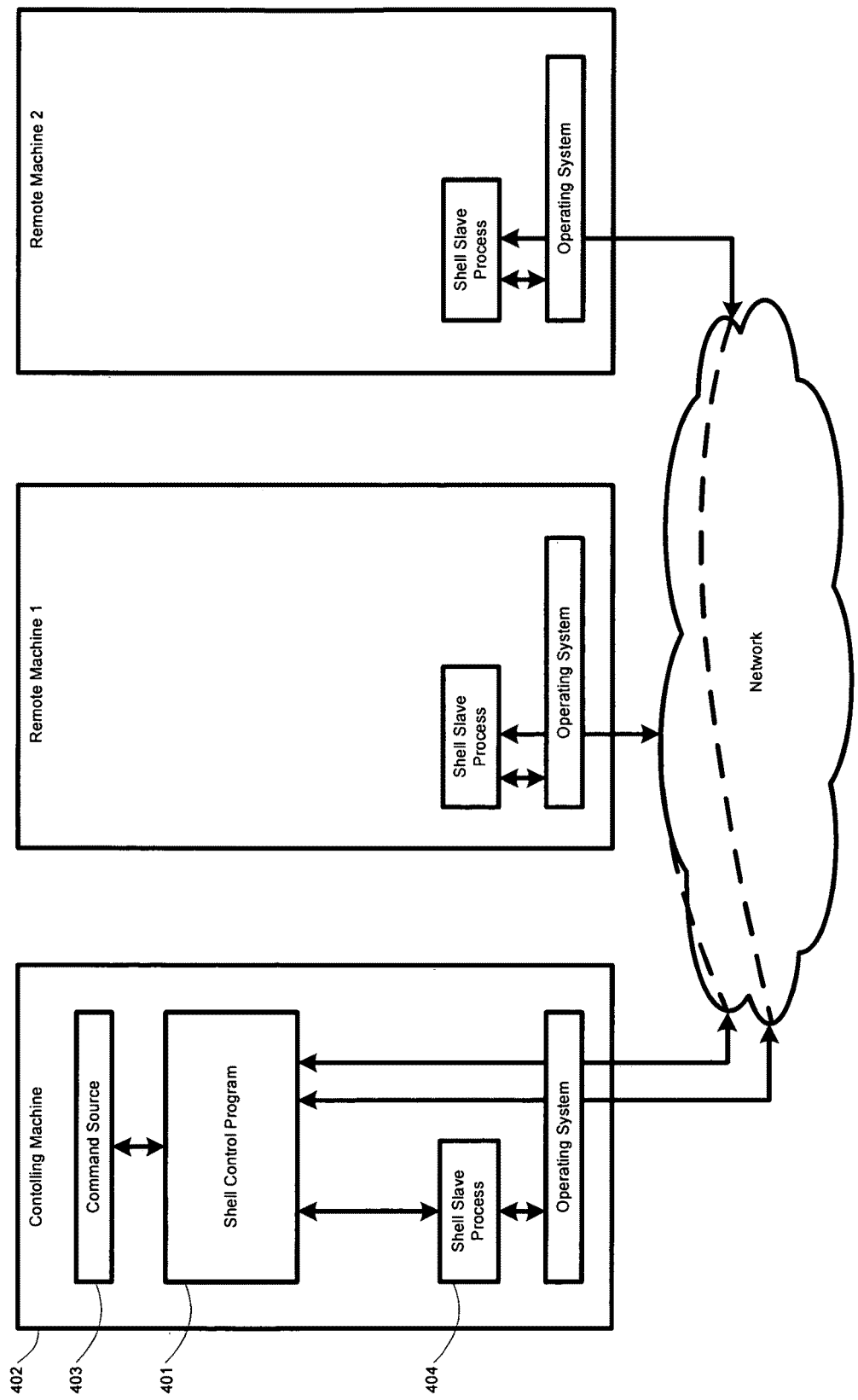

FIG. 4 illustrates the basic architecture of part of one embodiment of the current invention.

Figure 5:
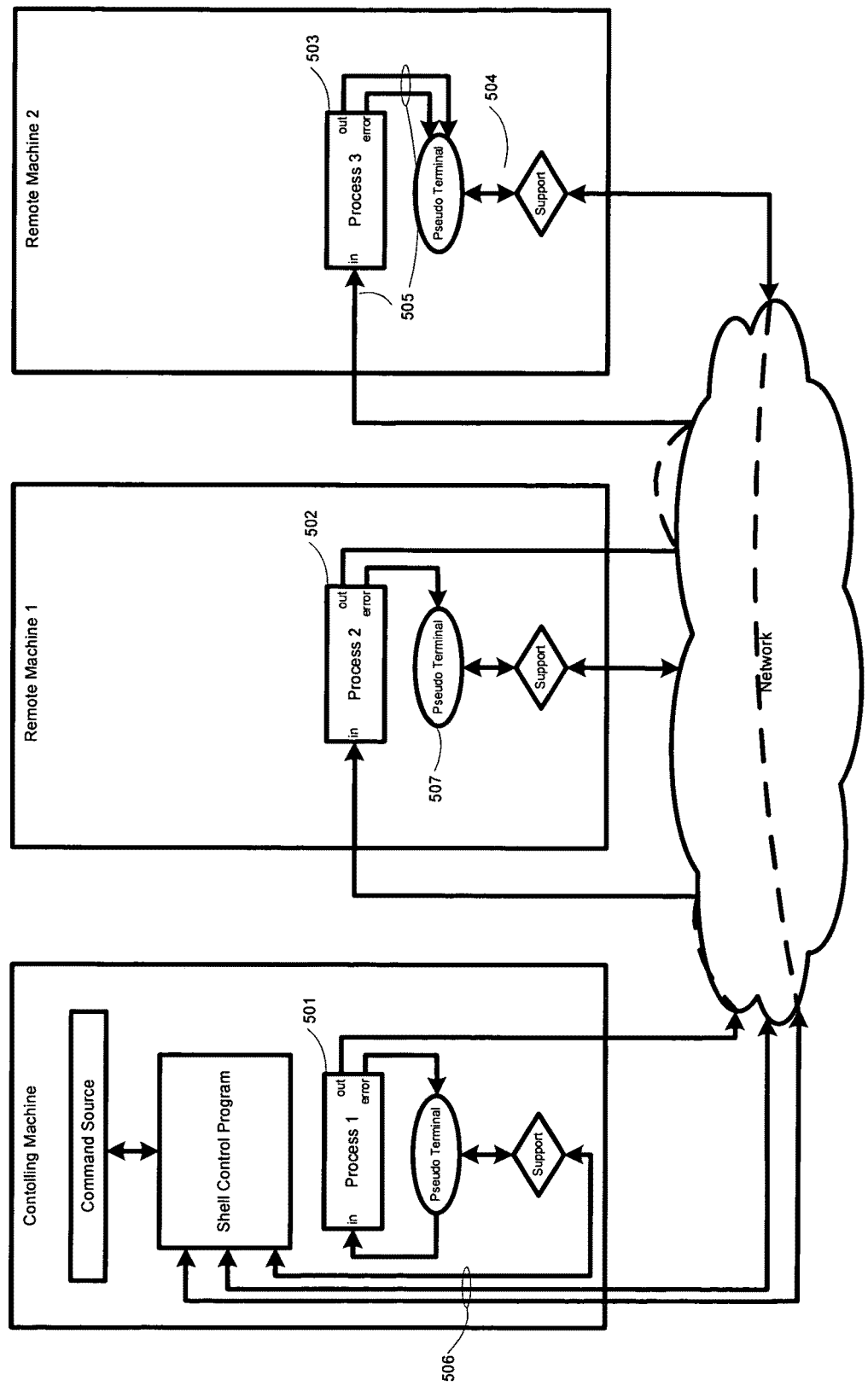

FIG. 5 shows an example of a command launched by one embodiment of the current invention.

FIG. 6 shows a grammar which could be used for text based command input with one embodiment of the current invention.

Figure 7:
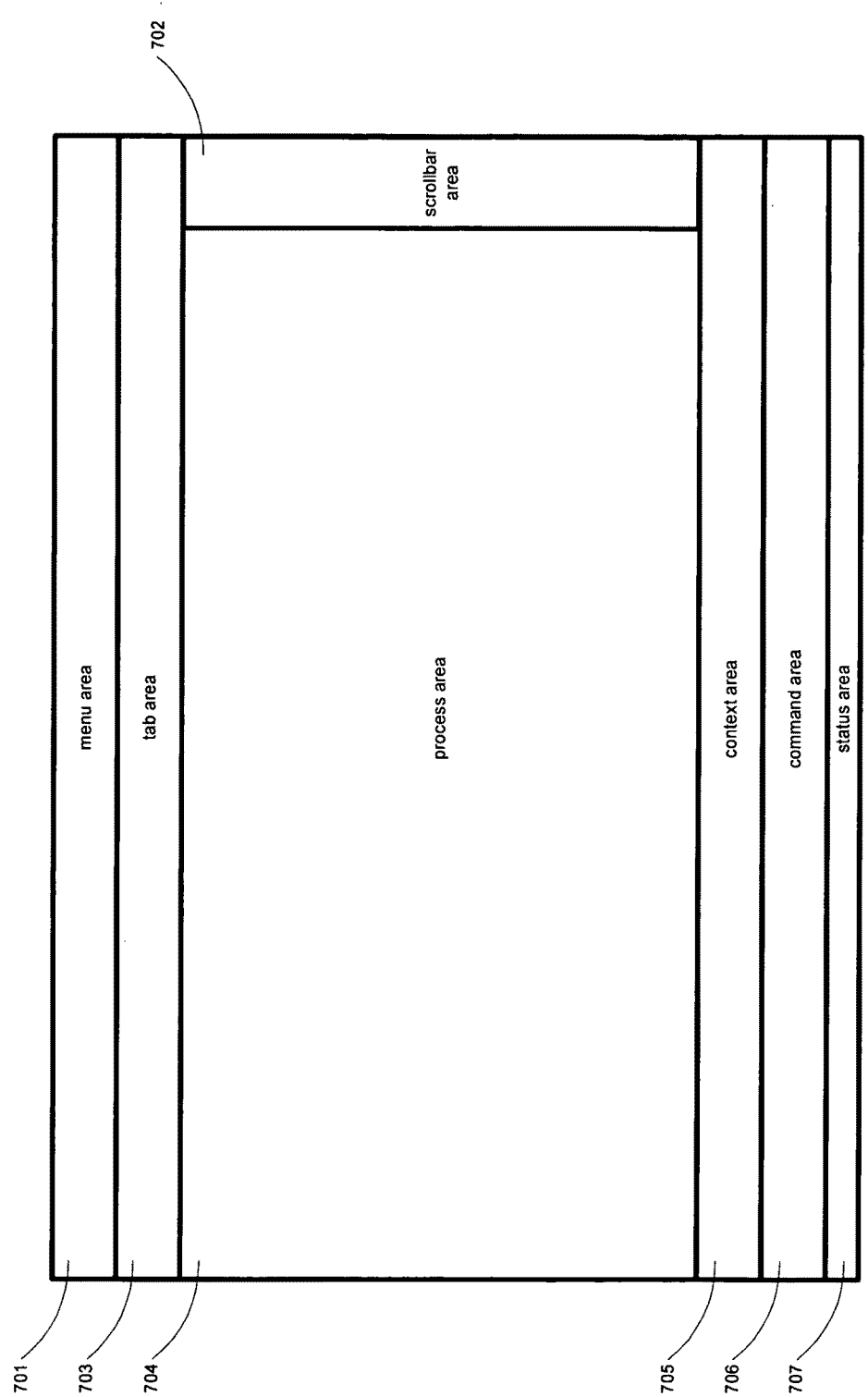

FIG. 7 shows one embodiment of a user interface which could be used with the current invention.

DETAILED DESCRIPTION

Overall Architecture

The architecture of one embodiment of the current invention is shown in FIG. 4. A shell control program (401) is deployed on a controlling machine (402). This program is designed to process commands from a command source (403). The command source may be for example a user typing commands interactively or a script. The shell control program may or may not have a graphical user interface. If the program has a graphical user interface this may be displayed whenever the program runs or only when it is run for a certain purpose e.g. displayed for interactive use and not displayed when the command source is a script. In another embodiment several control programs are provided for processing commands from different types of command source. In yet another embodiment, only a single type of command source is supported.

The shell control program reads input from the command source and passes this input to a parser. Parsing techniques for commands are well known and tools are available to assist in generating parsing code, for example ANTLR or Bison.

Command execution is carried out at operating system level by means of one or more shell slave processes (404). When a command or group of commands has been parsed and is ready for execution the shell control program determines which shell slave processes are required in order to launch the command. This will in the general case involve a plurality of shell slave processes on a plurality of machines. A plurality of shell slave processes may also be required on a single machine. One possible reason for this could be that the command involves elements running under more than one set of user credentials on that machine. Whether several slave processes are required on a single machine and the circumstances under which they are required will depend on the particular embodiment.

Once the shell control program has identified the type and location of the shell slave processes which will be required to execute the command, this list of required shell slave processes is checked against a list of shell slave processes currently deployed by the shell control program. Where required shell slave programs are not already running the shell control program will create the extra shell slave programs required to launch the command. Many methods exist for a program such as the shell control program to launch a process on a remote machine and any appropriate method can be used. In one embodiment a plurality of methods are implemented and the method may be either specified by the user or methods may be attempted in a prescribed order until one method succeeds. One such method is to initiate a connection to the remote machine using a standard protocol such as "telnet", "rsh", or "ssh" and execute the shell slave process using commands appropriate to the protocol and target operating system. Another such method is to have a daemon or service running on the remote machines which will either create the shell slave processes as required or perform as a shell slave process directly. Other such methods include using remote procedure calls (RPC) or remote method invocation (RMI) etc.

Having identified and set up as necessary the shell slave process required for the command each shell slave process is given instructions for executing the part of the command for which it is required. In the current embodiment this would be a series of low level commands for dealing with processes, files, network connections, pseudo terminals etc. The set of such commands includes commands for most if not all of the interactions with the host operating system needed by the shell. The command set isolates the shell control program from the specific operating system used by the host, allowing the shell control program to interact with many different operating systems with a single protocol. The command set may also include commands not directly supported by operating systems in general but which, for reasons of efficiency, are best carried out on the host operating system. An example of such a command would be searching for files matching a particular regular expression.

Embodiments of the processes described above are possible in many languages, however it is noted that choosing a low level language such as C for the shell slave program and a platform independent language such as Java for the shell control program has particular advantages. Such a combination allows full and easy access to system calls in the shell slave process, which can be a relatively simple program and can be tailored to different operating systems individually. The more complex shell control program can then be completely platform independent, isolated from the operating systems by the shell slave command set as described above.

In the current embodiment the commands given to the shell slave process set up a network of command processes running on the machines which together carry out the command read from the command source. An example of such a network is shown in FIG. 5. These processes include processes directly specified in the command (501, 502, 503) and any support processes (504) required to copy input and output data to and from network connections or to and from pseudo terminal instances set up by the shell slave processes etc. Such requirements may vary from operating system to operating system. Each process in the network of command processes may have multiple input and output data streams (505). Each data stream may be routed directly or indirectly over the network to another process or be sent to or read from a local file. Input and output data streams may also be routed directly or indirectly to machines over standard protocols such as http, ftp etc. They may also be routed to or sourced from the user. In the current embodiment these processes, once set up, run independently from the shell slave processes and are controlled during execution by the shell control program via independent control signals sent over combined signal and data channels (506). These channels also contain data being sent to or from the user.

After setting up the network of processes (FIG. 5), the shell slave processes (FIG. 4) remain on the machines ready to process further commands. These have been omitted from FIG. 5 for clarity. It is noted that these processes may either be the original shell slave processes or replacement processes created by the original shell slave process. It is also noted that the machines shown in FIG. 5 need not be running the same operating system and that the network shown is just one of many possible networks which could be produced by the current embodiment.

One problem with setting up this kind of network of command processes is that many existing programs include code to determine whether or not their input or output streams are connected to some kind of terminal and alter their behaviour as a result of this. This code may be part of the program concerned or may be part of a runtime library used by the program. For example, if connected to a terminal program output may be regularly flushed to the screen rather than buffered, a text based user interface may be supported, etc. The current embodiment solves this problem in a multi-host environment by: determining which data streams will eventually be sent back to or originate from the user; grouping these input and output streams into groups which can share a pseudo terminal instance or equivalent; creating a pseudo terminal or equivalent for each group and routing all such streams through that pseudo terminal or equivalent (507). In this way all data streams which will eventually come from or go to the user interface appear to the program concerned to be connected to a user interface. The programs should then behave as the programmers intended and as expected by the user even though they may not have been designed to run with other programs on remote machines in this manner. Allocating pseudo terminals or their equivalents in this way ensures that each command process being executed has the same kind of environment it would have if it were run under a prior art single machine single user shell such as bash or command.exe. This is different to the way current shells run processes in that current shells do not allocate pseudo terminals at all. Instead they simply use the single pseudo terminal to which they are connected by whatever process created the shell. Programs run by these prior art shells also make use of the same pseudo terminal.

A Grammar for Text-Based Command Input

A grammar for the current embodiment will now be described. Although some aspects of the current invention are described by reference to this grammar it will be understood that the details of the grammar can vary from embodiment to embodiment and in some embodiments of the current invention commands may be represented in graphical form and hence not require a grammar at all. FIG. 6 shows the grammar of the current embodiment in a format similar to Extended Backus-Naur Form (EBNF). Square brackets indicate optional elements and curly brackets indicate elements which may be optionally repeated any number of times. A vertical bar indicates that the elements before and after the bar are alternatives, round brackets indicate precedence and the := and ; symbols indicate a definition and the end of the rule respectively. The capitalised words represent simple groups of characters and symbols which could be derived from characters entered by the user with a lexer. Whether these particular rules or any other set of rules are actually implemented with a lexer rather than being implemented in the parser is not important. Where rules are defined in italics this is an informal description of a rule given in place of an formal definition for simplicity.

It is noted that the grammar given in FIG. 6 is intended to explain the language used by the current embodiment rather than completely and unambiguously specify the language. Implementation of the language from the grammar specified in FIG. 6 would require some additional code to disambiguate parts of the grammar in a sensible way and would also require rules to handle issues such as white space and quoting. Many valid approaches to these issues can be found in the prior art. For most ambiguities arising in this grammar a suitable disambiguation consists of remaining within or repeating the current rule or sub-rule rather than moving on to the next rule. This is sometimes referred to as making the rules match greedily.

URI-Based Syntax

The basic scheme for identifying files and similar objects across multiple host machines in this grammar is the uri, shown in rule P. The uri in this grammar is similar to a URI (Uniform Resource Identifier) in the prior art but differs in the way in which various elements may be omitted. These differences make it more suitable for entering commands with a minimum number of keystrokes. Apart from the syntactic elements, the rule contains four optional elements: a scheme (rule I); an authority (rule J); an address (rule K) and an absolute path (rule M). The scheme specified in rule I consists of a word followed by a colon. In a URI in the prior art, the format of the text following the specification of the scheme is specific to that scheme. Although this could be incorporated in a different embodiment the grammar currently being described is more limited in the syntax following the scheme for the sake of clarity. The authority (rule J) is used to specify a user name, a password or both. Both user name and password are optional. If the password is given it appears after the user name, if present, and in all cases immediately after a colon symbol. The address (rule K) is similar to the authority rule but contains a machine name and port rather than a user name and password. Again, both elements are optional but if a port is specified it must follow a colon symbol with both the colon symbol and the port being after the machine name, if present. A machine name could be specified by fully qualified domain name, a local machine name, an IP address or some other means. A port could be specified as a number, a service name which can be translated into a number or some other means. The absolute path given in rule M consists of an initial slash symbol followed by an alternating sequence of text elements and slash symbols. The grammar allows slash symbols other than the first slash symbol to be repeated without any change of meaning, this can be seen in rule N.

Although this is not a complete specification of the language, as mentioned above, the current embodiment uses three disambiguation rules for the uri (rule P) which are a more significant part of this embodiment than other such rules. These rules are:
(1) if any part of the address (rule K) is specified then either the AT or SLASH SLASH parts of rule P must be included;
(2) if any part of the authority (rule J) is included then the AT part of rule P must be included;
(3) if any part of the authority (rule J) is included and a scheme (rule I) is given then the SLASH SLASH part of rule P must be included.

These three rules allow the meanings of various partially specified uris to be uniquely determined.

This embodiment uses the URI-like syntax described above to contain parameters like schemes, user names, passwords, machine names, ports and paths. It will be understood, however, that this is not the only syntax which could be used to contain these parameters and a variety of suitable syntaxes may be used in alternative embodiments.

Parameters and Defaults

The current embodiment employs a concept referred to as a context. The context is a collection of all the information and settings needed to fully specify where and how to run a particular command or group of commands. In the current embodiment the context can specify the following information: a protocol; a port number; a set of user credentials including group identifiers, security tokens and passwords where applicable; a target machine; a current working directory; a set of environment variables; a search path for locating commands. Note that this information may not all be stored specifically for each context but may be derived from default settings or obtained via mappings from contexts of a particular type to groups of settings. All that is required is that the information can be determined from the context. Note also that other information may be included in the context where appropriate in any particular embodiment or some of the information listed above may be omitted. Different operating systems may also introduce requirements for further information. In the current embodiment, a context is associated with a unique label. The label can be empty, but there is only one context per label and only one context associated with an empty label. Rule H shows how a context is specified in the grammar of FIG. 6 as a context label (WORD) follows by a hash symbol.

A Generalized Resource

The concept of a resource in the current embodiment is something which can be specified not just by a uri but by the more general syntax of rule G. This rule uses both a context and either a uri as described above or a relative path to specify a particular file, command, directory or similar. Here commands could include executable files; commands built into the shell program or aliases where an alias is a name is linked to another command. Rule G is composed of an optional context specification followed by a relative path or uri. The context label is separated from the path or uri with a hash symbol (rule H as described above). Clearly a variety of symbols could be used in place of the hash symbol in alternative embodiments.

When a uri is used the parameters in the uri can override most but not necessarily all of the information contained in the context. The information in the context acts as a set of default settings. Note that other default settings may be used in addition to the context. Note also that all elements are optional in rule G. If the context is omitted then the current default context will apply. If all elements are empty the resource specified will be the current working directory of the current default context. Where a relative path is used (rule L) this path is relative to the current working directory in the context specified or, if no context is specified, the default context.

Search Paths

Where rule L is used to specify a resource (from rule G) but only a single word is entered as the relative path this is treated as a special case. Rather than being taken as a relative path and specifying a resource in the current working directory a search path is used to locate the resource. This search path may or may not include the current working directory. The search path used is determined by the context. The path could either be contained in the context or there could be a mapping from the set of contexts to a set of paths. In this embodiment the path can contain different types of elements including: directories; wildcard patterns specifying files or directories; built-in commands and aliases. These elements are contained in the path in a set order and are reviewed in that order until one of the elements matches the command entered. Matches could mean that the directory specified contains a file named according to the command entered or it could mean the command entered matches the name of a built in command or matches the name of an alias specified by the user. As a result of searching the path a resource is either uniquely identified as being first on the path or the resource is not found.

Entering Commands

At the top level of this grammar, the user enters commands as defined in rule A. There are two types of command, context commands (rule B) and list commands (rule C). A context command is defined in rule B and consists of a context label (WORD) and a resource separated by a percentage symbol. A variety of symbols could be used in place of the percentage symbol in different embodiments. The context label itself is optional, omitting this specifies an empty label as discussed above. The effect of this command is to set up a context with the information specified by the resource and associate it with the given label. This context replaces any previous context associated with that particular label if one existed. The label can now be used to select the context according to rule H.

Parameters which may be part of the context but do not form part of a resource (like a set of environment settings or a path) clearly cannot be set up in this way with the current grammar. However, there are a variety of ways such parameters can be specified or altered. For example a system of defaults could be used where defaults are applied to contexts on a particular machine or group of machines. Such information could be set up in a configuration file or, where a graphical user interface is used, via menus and dialog boxes. Another alternative is to extend the grammar to include the ability to specify this information. In simpler embodiments paths, environment variables and other such parameters could even be fixed for all contexts.

A list command (rule C) is a sequence of pipe commands separated by list operators. Pipe commands will be described below. In the simplest case a list command contains a single pipe command without any list operators. The list operators for this embodiment are shown in rule Q. The operators separate pipe commands which are to be run sequentially under certain conditions. The choice of operator used determines the conditions under which commands following the operator will run. The three alternative operators listed in rule Q will run the commands after the operator under the following conditions respectively: where the previous command succeeded; where the previous command failed; where the previous command completed (succeeded or failed). Success or failure of pipe commands could be determined in various ways. In one embodiment success could be defined as the last process in the pipe returning zero. In another embodiment the criterion for success could be chosen by the user. Rule C also allows a list operator to be specified at the beginning of the list command. In the current embodiment, this indicates the pipe command is run after and is dependent on a command previously entered by the user. This previously entered command may be already running or may have completed. This effectively continues the list between commands entered at the top level of this grammar (rule A).

Rule D shows the composition of a pipe command. The pipe command consists of a sequence of resources with optional attachments (rule E) separated by pipe operators. In the simplest case a single resource is specified. The pipe command executes one process per resource specified in rule D on the host specified by the resource. Output from each resource preceding a pipe symbol is sent to the input of the resource following that pipe symbol. Processes typically have two output streams called standard output and standard error. The pipe operator used determines which of these streams is or are fed to the input of the next resource. In the current embodiment the pipe operators shown in rule U specify respectively: the standard output; the standard error; both standard output and standard error. Input to the first resource, if required, is taken from the user via a terminal emulation. The remaining output streams may be redirected as specified by rule F or by default are fed to the terminal emulation via appropriately allocated pseudo terminals or equivalent as described previously. The redirect (rule F) is one of two types of attachment (rule E) and may be present after the resource and before the pipe operator (rule D). The redirect consists of a redirect operator (rule T) followed by a resource specifying where the output is to be redirected to. This might be, for example, a file on a file system or ftp server or similar.

The second type of attachment specified in rule E is an argument (rule O). Arguments are passed to the resource being executed as input parameters. An argument can be any piece of text although quoting may be required to disambiguate it from other parts of the grammar. The argument may be a valid resource specification in which case particular embodiments may perform further operations in order to make the resource given as an argument available to the resource being executed. For example a local copy of a remote file may be made and the argument adjusted to refer to this file. In another embodiment a resource given as an argument is treated purely as text.

The default context is important when entering commands and resources as specified in rule G. There are many ways this could be adjusted but in the current embodiment this is done by entering the context label followed by a hash symbol with no command. This is a special case of a command (rule A), being a just a context (rule H) which is a type of list command (rule C), pipe command (rule D) and resource (rule G). Entering the context label in this way sets the context associated with the label as the default context.

Paths with Host Names or Drive Letters

Under some operating systems, for example Unix, a full path is sufficient to access any file in the file system. Under other operating systems, for example Windows XP, a drive letter or a host name may also be required to specify the file. This does not fit conveniently into a path structure. Several solutions exist to this problem and any appropriate method can be used. One possible method is to take either the drive letter or host name on which the file resides as the first element of the full path. This is ambiguous where a host name has a single letter. To resolve this, a single letter as the first element of the path is always taken to be a drive. Although this makes host names with a single letter inaccessible such host names are uncommon and a suitable quoting syntax could be introduced to circumvent this problem if required.

Example Commands

To clarify the operation of the grammar a possible sequence of commands is given below, one command per line:

```
pc%guest@desktoppc/c/workdir
ws%mylogin@workstation.somedomain.com/
fs%ftp://ftp.somedomain.com/pub/doc
```

This sequence of commands sets up three contexts labelled pc, ws and fs. The first context, pc, is set to a directory workdir on the C drive of a machine called desktoppc with user credentials of guest. This could be a machine running for example Windows XP. The second context, ws, in this example is set to the root directory of a workstation running unix-like operating system. The third context is set to the /pub/doc directory on an ftp server. This will be accessed using the ftp protocol so the operating system could be unknown. Having entered the three commands above a subsequent command could be:

ws#/bin/grep keyword<rs#doc.txt>pc#results.txt && echo ok

This command would run the program /bin/grep on the workstation, reading input from the file doc.txt via ftp and writing the results to a file results.txt on the machine desktoppc. If the command succeeds then the message ok will be printed by the echo command. Any messages from the grep command present on the standard error stream will be presented to the user as these are not redirected. Since a path to echo is not given this command must be found on the search path as described previously.

User Interface

As previously mentioned, embodiments of the current invention may as an option have a graphical user interface. One possible embodiment of such a graphical user interface is shown in FIG. 7. This graphical user interface, described in more detail below, is intended for use with text based command input. Note that other embodiments may use graphics (i.e. diagrams, icons, graphs etc) to facilitate command input or they may be entirely text based and run on a simple terminal or terminal emulator.

The user interface of FIG. 7 is divided up into seven areas. At the top there is a menu area (701) and along the right hand side there is a scroll bar area (702) containing two scroll bars. The remaining space is divided into, from top to bottom, a tab area (703), a process area (704), a context area (705) a command area (706) and a status area (707). A user types commands into the command area. Interpretation of these commands is affected by a default context as described above and information about the default context is displayed in the context area. The context area may also include graphical controls to allow the default context to be changed using a mouse. Typing the command into the command area is an interactive process whereby the shell control program may assist the user in entering the command by displaying possible options for continuing the command as well as providing feedback on the way the parts of the command already entered have been interpreted. One such method of providing feedback is to show parts of the command entered in different colours. Another such method is to display messages in the status bar. In the current embodiment both methods are employed. When the user has finished the process of entering the command, the user indicates that the command should be executed, for example by pressing the enter key. This creates a process window within the process area. The window is created immediately and all further interactions with or control of that command is done via the process window. The user is now free to run further commands without waiting for the first command to complete. Furthermore, any additional commands entered would be allocated new process areas in the same way. This is an improvement over current shell programs such as bash where commands and output from multiple unrelated processes are mixed together on the screen. It is also an improvement in that command input is never mixed with output from running processes.

Space Efficient Input and Output

In the current embodiment of this optional graphical user interface the process window (within the process area, 704) can act as a terminal emulator. Normally terminal emulation programs have a number of rows and columns set by the user, all of which are displayed on the screen. This number of rows should not be confused with rows of history or scroll-back as these lines do not form part of the emulated display. One problem with using current terminal emulators for this application is that each command would require a significant amount of space on the screen. This is problem is solved in the current embodiment by: determining a sensible amount of rows and columns for the emulation (e.g. to cover the entire process area); starting the cursor on the bottom row of the emulated screen; keeping track of which lines on the emulated screen have been written to and having the process window height vary so that any block of unused lines at the top of the emulation are not shown. In this way if the command only produces a few lines of output then the process window will only take up the space required to show those lines. However, if a command uses all the lines being emulated, as for example an interactive command like vi under Unix would do, then the terminal emulation automatically displays the full number of rows emulated.

Handling Passive and Interactive Commands

Another problem with displaying multiple terminal emulators as described above is that some commands require interaction with the user and others do not. When a user enters a command which requires immediate input from the user, for example ftp, it is desirable to allow the user to interact with this command immediately rather than having to first select a window to interact with the command. Where the command does not require input it is desirable for the user s subsequent input to be directed to the command area. However, there is no easy way to identify in advance which commands under which circumstances will require user input. To solve this problem the current embodiment includes a method of detecting when a command is waiting for input from the user and moving the input focus to the command window at this point unless the user is actively performing some other input operation.

This input detection mechanism is implemented in the supporting processes running on each host where parts of the overall command are running. The method of detecting when a process requires input is operating system specific. Under Unix or unix-like operating systems one possible embodiment of this mechanism is for the task to read its input from a pseudo terminal where the task itself is a background task for that pseudo terminal. When the task attempts to read input from the pseudo terminal it will be stopped and a signal will be sent to the parent process of that task. On receipt of that signal, the parent process puts the task into the foreground and allows it to continue. A signal is also send to the shell control program indicating that the task requires input. The shell program can then change the input focus to the associated process window if appropriate. An alternative method which may be more suitable for other operating systems is to create the task so that it is reading input from a pipe connected to a supporting process. Operating specific functions can then be used in the supporting process to determine whether input is being read from the other end of the pipe and this information fed back to the shell control program as before.

Whether or not it is appropriate to move the focus may depend on whether the user has done anything else since launching the command, how long the command has been running and other such factors. A visual indication that the task requires input can also be given. Any change in the focus of the user interface can also be indicated visually in some way.

Organising Multiple Commands

The scrollbar area (702) contains two scrollbars. The first scrollbar allows the user to scroll the text in a selected terminal window in the same way text is scrolled in current terminal emulation programs, for example "xterm". Note that although the process windows do vary in size depending on the amount of output received as described above, they would not normally become larger than the displayable area of the screen. The processes windows can also be resized individually by the user. Output text which does not fit into the resulting areas (i.e. has scrolled off the screen) is therefore accessed with the first scroll bar. The second scroll bar allows the user to scroll the entire set of process windows up and down, allowing access to more terminal windows than will fit into the process area of the gui. Furthermore, the tab area (703) contains tabs which allow the user to group process windows logically. Each process window is assigned to one tab and selecting a tab allows the user to view the set of process windows assigned to it. As an optional feature, each tab may also be associated with a set of default settings for new commands. In this way each tab can become a different environment for the user if required.

Command Completion

Command completion means any method of providing the user with, where possible, one or more valid ways to continue entering the command they are typing based on the part of the command already typed. Command completion is typically based on finding commands or file names which start with something the user has already typed. It need not actually offer the user a way to complete the entire command or file name being entered, although it may do. Some systems for example provide the user with a way to continue the file name being entered only up to the point where several alternatives exist. This may only be one or two letters or it could be nothing. It is noted that parts of the current invention are not dependent on having a method of command completion and that the methods of providing command completion described here are some of many possible methods of command completion which could be used.

An important advantage derived from having a shell operate on a plurality of machines on an equal basis, as is done in the current embodiment, is the ability to integrate command completion across multiple machines. This improved completion can also take account of other factors like the user credentials being used, the current search path etc. In other embodiments, command completion is not limited to information from file systems and completions may be derived from other sources like previously entered commands, a database of commands or some other source.

In the current embodiment of the completion feature a user presses a key when completion is required. At this point the shell control program determines which machine and user credentials apply to the section of the command currently being entered. Possible completions for the command or file name being entered are then generated by querying the relevant shell slave process which can efficiently query the file systems concerned. If applicable the current search path is used and in this case a plurality of shell slave processes on a plurality of machines may have to be queried if specified by the search path. In this embodiment, all possible completions up to the end of the current command or file name are considered. This may involve a significant number of possible alternatives and to help the user quickly select the option required a new type of selection system is used. Two lists are made by the shell control program, each list containing all of the possible completions. The lists are sorted by two different sorting criterion. For example, one list could be sorted alphanumerically and the other list could be sorted by length first, then alphanumerically where alternatives of the same length exist. The user can then move between the alternative selections either by choosing longer or shorter selections or alphabetically. This is done with four keys. For example left and right cursor keys could select shorter or longer selections respectively whilst the up and down cursor keys could select alternatives before or after the current alternative in an alphanumerical sense. At any point during the selection of the desired alternative any one of the four keys can be used to alter the selection towards the desired selection. To start the process an initial selection is presented. Keys must also be designated to conclude or cancel the completion process. The normal conclusion of the process is for the last completion to be accepted and this can be the default action which occurs should the user stop pressing the special completion keys and continue entering the command with some other key.

General

While the invention has been particularly shown and described with reference to particular embodiments, it will be understood by those skilled in the art that various changes in form and detail may be made without departing from the spirit and scope of the invention.

I claim:

1. A method of running a command involving a plurality of machines, said method comprising:
   (a) providing code to interact with all the types of operating system used by the individual machines which comprise said plurality of machines,
   (b) obtaining a group of one or more commands from a command source,
   (c) parsing said group of commands according to a grammar which allows all of but may or may not require each of the following:
      (c1) parameters including a machine, username and current working directory to be associated with labels,
      (c2) commands from said group of commands to be split into a group of elements where elements from said group of elements may send output to or read input from other elements within said group of elements,
      (c3) each element within said group of elements to be associated with one of said labels thereby associating the parameters associated with said label with said element,
   (d) running said code to interact with operating systems where said code for interacting with operating systems is required in order to run said command and where said code for interacting with said operating systems is not already running in a suitable form as a result of previous commands executed using this method,
   (e) instructing and coordinating said code for interacting with operating systems so as to execute said command, whereby complex commands involving various elements on various machines can be executed.

2. The method of claim 1 wherein said grammar includes grammatical elements substantially as described by or equivalent to that described by the whole of FIG. 6.

3. The method of claim 1 used to implement a shell substantially as hereinbefore described with reference to the overall architecture depicted by the whole of FIG. 4.

4. A method of specifying parameters for executing a command or partial command on one of a plurality of machines, comprising:
- (a) obtaining said parameters,
- (b) associating said parameters with a label,
- (c) storing said parameters, said label and said association between said parameters and said label,
- (d) associating said label with said command or partial command, whereby said label allows said parameters to be specified for said command or partial command in an abbreviated manner.

5. The method of claim 4 wherein said parameters include parameters selected from the group consisting of a host name, a set of user credentials, a current working directory, a set of system settings, a set of environment variables and a search path.

6. The method of claim 5 wherein:
- (a) said command or partial command is in text format,
- (b) said label is adjacent to said command or partial command,
- (c) said label and said command or partial command are separated by a symbol.

7. The method of claim 6 where said command takes the form of a pipeline of processes.

8. The method of claim 6 where said command takes the form of a list of pipelines of processes, said pipelines in said list being executed in a predetermined sequence.

9. The method of claim 8 wherein the execution of any of said pipelines may be dependent on a result obtained from a previously executed said pipeline.

10. The method of claim 9 wherein the details of said dependency are indicated by a symbol, said symbol being placed between an adjacent pair of said pipelines, said symbol also acting as a separator for said adjacent pair of pipelines.

11. The method of claim 10 where said pipeline of processes includes means for selecting a set of streams to be redirected at each stage of the pipeline, said set of streams being selected from a group containing: the standard output stream and the standard error stream.

12. The method of claim 11 using a grammar which includes grammatical elements substantially as described by or equivalent to that described by the whole of FIG. 6.

* * * * *